Aug. 22, 1939.   W. H. FRANK ET AL   2,170,297
TROLLEY OR COLLECTOR
Original Filed June 8, 1936
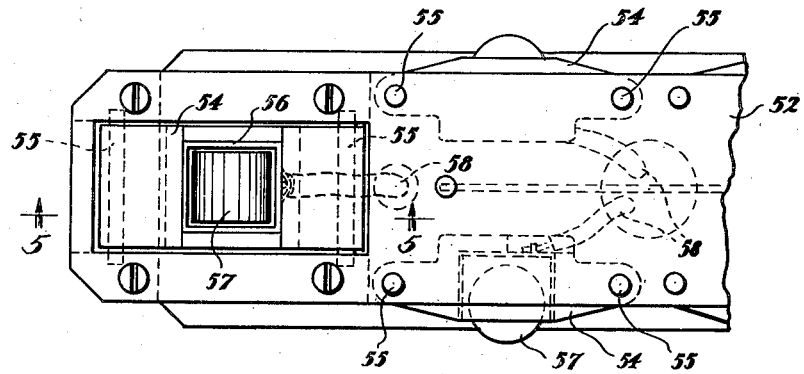
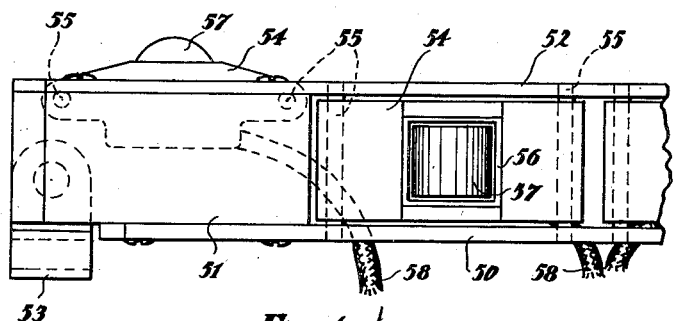
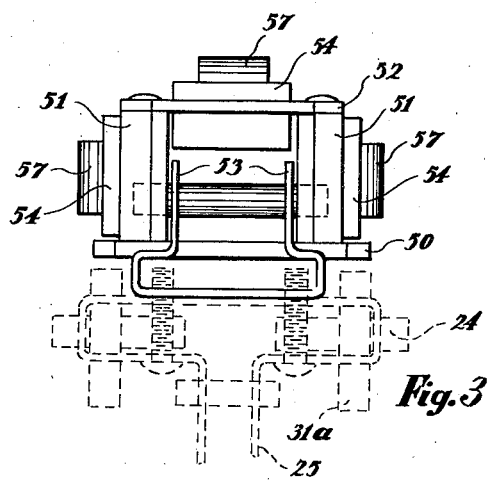
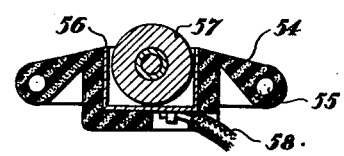
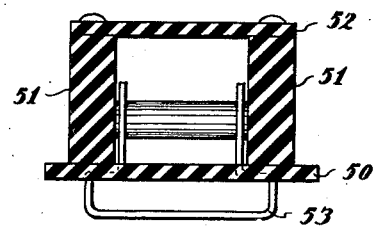
INVENTORS
William H. Frank
BY Lyman C. Fisher
Daniel G. Cullen
ATTORNEY.

Patented Aug. 22, 1939

2,170,297

UNITED STATES PATENT OFFICE 2,170,297

TROLLEY OR COLLECTOR

William H. Frank and Lyman C. Fisher, Detroit, Mich.

Application June 8, 1936, Serial No. 84,070
Renewed December 29, 1937

5 Claims. (Cl. 191—48)

This application relates to improvements in trolleys or collectors useful with duct of electrical distribution systems.

A prior application, Serial No. 27,523, filed June 20, 1935, shows a collector having a T shaped carriage upon which is mounted and supported a contact head.

The present application relates particularly to improvements in the head per se, and except insofar as the carriage forms part of the combinations shown herein and considered as part hereof, the carriage per se forms no part of the present invention.

For an understanding of the details of construction of the collector here shown, reference should be had to the accompanying drawing disclosing the collector. In the drawing, Fig. 1 is a fragmentary side view of a collector head per se;

Fig. 2 is a top plan view thereof;

Fig. 3 is an end view thereof;

Fig. 4 is a transverse section thereof;

Fig. 5 is a fragmentary section on line 5—5 of Fig. 2.

The carriage

The carriage of the collectors here shown is the one disclosed in Serial No. 27,523. It will not therefore be specifically described. Suffice it to say it comprises an elongated sheet metal plate 25 bent in the form of a double walled T to provide a vertical and a horizontal portion.

Journalled in the latter are side thrust rollers 24 and support rollers 31a.

The head

The head shown includes an elongated fiber plate 50 on which are disposed edgewise four fiber abutment blocks 51 which are surmounted by a fiber plate 52 of considerable length and to the fiber blocks are secured the legs of U-straps 53 whose bights are disposed against and are secured to the horizontal portions of the carriage supporting the housing formed by parts 50—51—52 on the carriage.

Plate 52 has two oblong holes filled by and in which are rubber plates 54 and through the ends of these pass pins 55 which mount these plates with respect to the housing, the ends of the pins 55 seating in sockets of the blocks 51. Between the blocks and aligned therewith so as to close and fill in that part of the housing side walls left clear by the space between the ends of these blocks are rubber plates 54 supported by pins 55 journalled in plates 50 and 52. Each plate has a cupped central portion containing a metal cup 56 journalling a contact roller 57 on an axle therein and to each cup 56 is connected a terminal of a load conductor 58.

The resilience of the rubber plates 54 tends to maintain the rollers 57 projected outwardly and the reaction against these rollers as they roll along the bus bars is absorbed by the flexure of the plates 54 about their supporting pins 55.

It is noted that the rubber plates 54 function to retain the metal cups 56 and their contained rollers 57 removably but firmly in assembly without the aid of auxiliary fastening means: the cups may be snapped into or out of the plates at will, and when so snapped, in will be retained therein very firmly.

The housing is rigid and completely closed and the contacts thereof, though resiliently mounted with respect to the housings as a whole, nevertheless do not expose the interior of the housing during their movement to any substantial extent, the housing remaining sealed at all times. This is of importance in that disturbances due to loose terminals of load conductors is minimized for these terminals are always completely enclosed in a sealed housing.

Now having described the collectors hereof, reference will be had to the claims which follow for a determination of the protection sought herein.

We claim:

1. A trolley collector comprising an elongated supporting member substantially closed by walls and having an opening, a flat plate of flexible material flush within and substantially bridging the edges of the opening and so disposed that it is free of all other structure except at its end anchorages, and a contact supported by said plate and embedded therein and exposed to the outside of the supporting member, the opening being substantially completely closed by the assembly of the plate and contact, the contact including a metal cup containing an axle and a roller journalled therein.

2. A trolley collector comprising an elongated supporting member substantially closed by walls and having an opening, a flat plate of flexible material flush within and substantially bridging the edges of the openings and anchored at its ends to the supporting member at the edges of the opening and so disposed that it is free of all other structure except at its end anchorages, and a contact supported by said plate and embedded therein, exposed to the outside of the supporting member, the opening being substantially completely closed by the assembly of the plate and contact, the contact including a metal cup containing an axle and a roller journalled therein, and a conductor terminal connected to said cup through a hole of said plate.

3. A trolley collector including an elongated rigid supporting member having part thereof hollow and having two openings in the walls of said hollow part, a unitary plate-like contact assembly mounted on the supporting member by being connected thereto at the edges only of one of such openings and flush within and substantially filling and closing such opening, and having a contact exposed to the outside of the supporting member, the assembly having a resilient portion for urging the contact outwardly and arranged to leave the interior of the hollow part free of any springs for so urging said contact, and a load conductor entering the hollow part through the other of said openings and having a terminal within such hollow part connected to the contact through the contact receiving opening and anchored to the contact assembly.

4. A trolley collector including an elongated rigid supporting member having part thereof hollow and having two openings in the walls of said hollow part, a unitary plate-like contact assembly mounted on the supporting member by being connected thereto at the edges only of one of such openings and flush within and substantially filling and closing such opening, and having a contact exposed to the outside of the supporting member, the assembly having a resilient portion for urging the contact outwardly and arranged to leave the interior of the hollow part free of any springs for so urging said contact, and a load conductor entering the hollow part through the other of said openings and having a terminal within such hollow part connected to the contact through the contact receiving opening and anchored to the contact assembly, the assembly comprising a cup-shaped rubber member having the contact embedded therein.

5. A trolley collector including an elongated rigid supporting member having part thereof hollow and having two openings in the walls of said hollow part, a unitary plate-like contact assembly mounted on the supporting member by being connected thereto at the edges only of one of such openings and flush within and substantially filling and closing such opening, and having a contact exposed to the outside of the supporting member, the assembly having a resilient portion for urging the contact outwardly and arranged to leave the interior of the hollow part free of any springs for so urging said contact, and a load conductor entering the hollow part through the other of said openings and having a terminal within such hollow part connected to the contact through the contact receiving opening and anchored to the contact assembly, the assembly comprising a cup-shaped rubber member having the contact embedded therein, the connection between the contact and terminal being established through a hole in the back of the plate.

WILLIAM H. FRANK.
LYMAN C. FISHER.